May 2, 1939.　　　　T. PETERSEN　　　　2,156,701

BELT DRIVE MECHANISM

Filed Nov. 21, 1936　　　2 Sheets-Sheet 1

INVENTOR
Thorvald Petersen
BY
Parker, Brockwood & Farmer
ATTORNEYS

May 2, 1939.    T. PETERSEN    2,156,701
BELT DRIVE MECHANISM
Filed Nov. 21, 1936    2 Sheets-Sheet 2
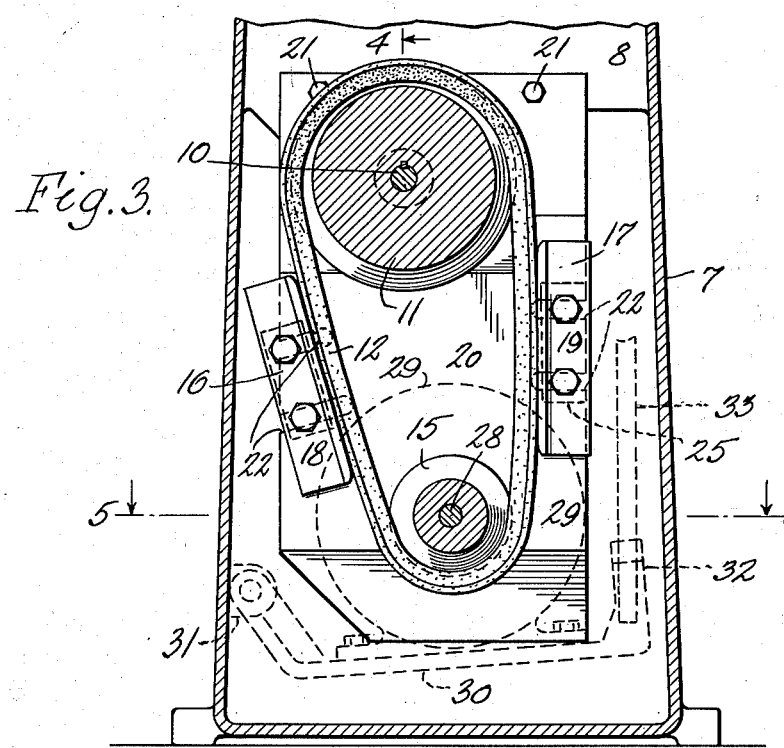
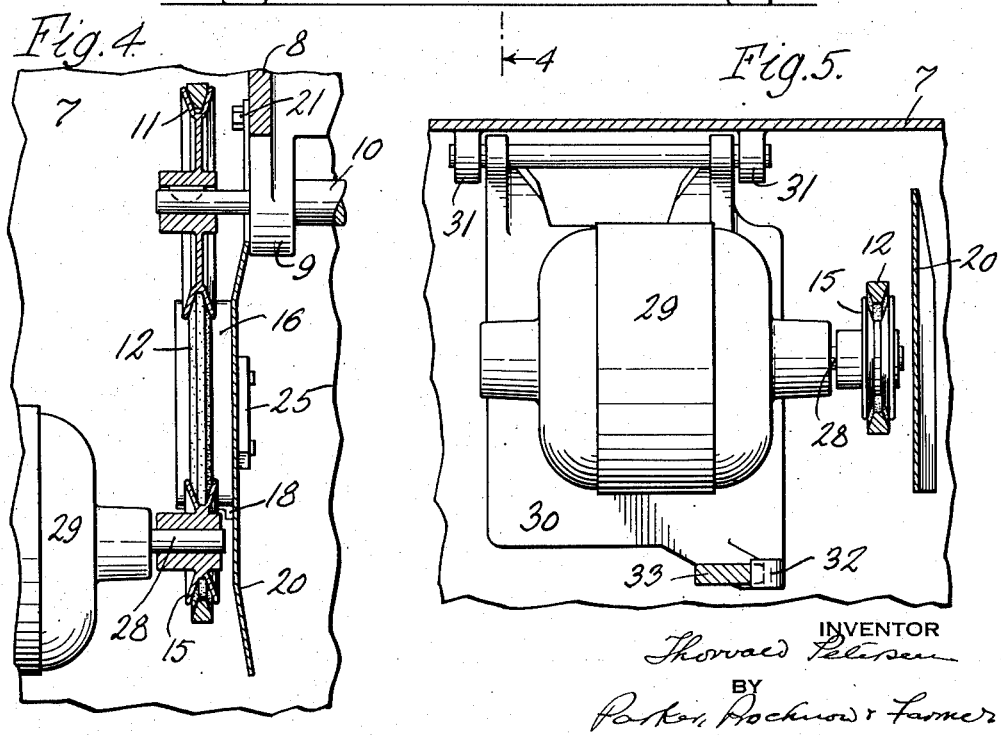
INVENTOR
Thorvald Petersen
BY
Parker, Hockrow & Farmer.
ATTORNEYS

Patented May 2, 1939

2,156,701

UNITED STATES PATENT OFFICE 2,156,701

BELT DRIVE MECHANISM

Thorvald Petersen, Erie, Pa., assignor to R. G. Wright & Company, Buffalo, N. Y.

Application November 21, 1936, Serial No. 112,107

2 Claims. (Cl. 74—219)

This invention relates to belt drive mechanisms, and more particularly to such mechanisms in which a belt of the type commonly referred to as a "V-belt" is employed.

One of the objects of this invention is to provide a belt drive mechanism of this kind which may be used for interrupting the transmission of power through the belt. Another object of this invention is to provide a belt drive mechanism of this type with means for confining portions of the belt in such a manner as to permit one of the pulleys cooperating with the belt to move out of driving engagement with the belt. It is also an object of this invention to provide belt drive mechanism of this kind which is so arranged that when the pulleys are in such relation to the belt as to interrupt the drive, the belt will remain in a stationary position to avoid wearing of the same. Another object of this invention is to provide a drive mechanism of this kind in which the sides of the belt between pulleys are confined to limit the outward movement of the sides of the belt, so that a portion of the belt will be held out of contact with the pulley. Other objects of the invention will appear from the following description and claims.

In the accompanying drawings:

Fig. 3 is a sectional elevation thereof on line 3—3, Fig. 2, showing the parts of the mechanism in the position in which the transmission of power is interrupted, the positions of the driving motor and its supporting base being indicated by broken lines.

Fig. 4 is a sectional elevation thereof on line 4—4, Fig. 3.

Fig. 5 is a sectional plan view thereof on line 5—5, Fig. 3.

Figure 1:
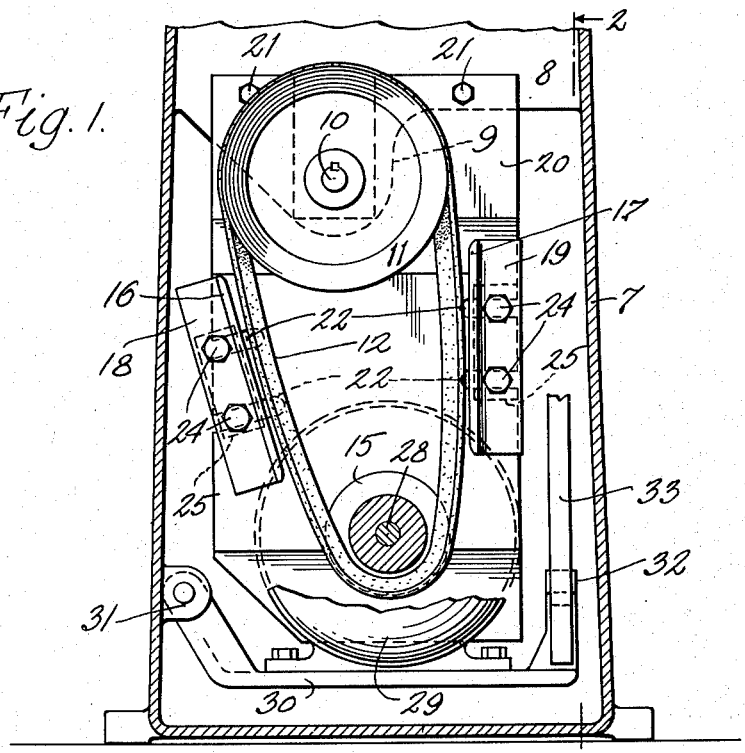
Fig. 1 is a face view of a belt drive mechanism embodying this invention showing the same installed in a machine or apparatus of which the belt drive forms a part, the parts of the mechanism being shown in driving position.

In the particular embodiment of my invention shown in the accompanying drawings, the same is shown arranged within a housing 7 of a machine driven by means of my improved belt drive mechanism. This housing has a transverse frame member or bracket 8 which has a downwardly extending part or projection 9 in which a bearing is formed for a shaft 10 on which one of the pulleys of the belt drive, for example, the driven pulley 11, is secured. This pulley cooperates with a belt 12 of the type commonly referred to as a "V-belt", and which is approximately of V-shaped cross section. The pulley 11 has the rim portion thereof formed to cooperate with the V-belt, being provided with the usual V-shaped groove in which the belt operates. The belt also cooperates with a driving pulley 15, the edge portion of which is also provided with a V-shaped groove.

Belts of this type are usually operated loosely and will transmit power most efficiently if the belt is not stretched tightly between the two pulleys, resulting in less pressure on the bearings of the pulleys and, consequently, in less friction. It is also a characteristic of these belts that if the tension on a belt is reduced or removed, the belt tends to assume an approximately circular form. Consequently, if it were endeavored to disengage the pulley 15 from the belt by moving the same upwardly toward the pulley 11, the sides of the belt would move outwardly in such a manner that a portion of the belt would still touch the pulley 15 and receive power therefrom and an excessively great movement of the pulley 15 would be necessary before the same would actually be out of contact with the belt. In V-belt drives, the interruption of the transmission of power by moving the pulleys toward each other has, consequently, heretofore not been practical because of the excessive movement required.

In accordance with my invention, I provide means which engage the belt so as to overcome the tendency of the belt to assume an approximately circular position. In the particular construction illustrated for this purpose, I have shown a pair of belt-confining plates or webs 16 and 17 arranged at opposite sides of the belt in such a manner that if the driving pulley 15 is raised from the driving position shown in Fig. 1, to the position shown in Fig. 3, the belt will engage the confining plates or webs 16 and 17 so that the belt will be held in a position closely approximating its position when transmitting power. Consequently, the lower end of the belt shown in these figures will be out of contact with the lower pulley 15. If the pulley 15 is the driving pulley, no motion will be transmitted to the belt, and consequently the portions of the belt touching the confining members 16 and 17 will not be in motion, so that no friction between the belt and these members will result. When it is desired to again transmit power to the belt, it is merely necessary to lower the pulley 15 into frictional engagement with the belt, and to place sufficient tension on the belt so that the sides thereof will be drawn out of engagement with the confining plates or webs 16 and 17.

Preferably the pulley 15 when moved out of driving engagement with the belt, assumes a position as clearly indicated in Figs. 3 and 4, in which the belt, while out of contact with the pulley, still extends into the groove of the pulley. This avoids displacement of the belt when idle, so that the belt is always in position to engage in the pulley groove when the driving pulley is lowered into driving position.

The confining members for the sides of the belt may, of course, be of any suitable or desired form and may be adjustable toward and from the belt. In the construction illustrated, the plates 16 and 17 are the webs or legs of angle bars, the other flanges or legs 18 and 19 of which may be mounted on any suitable support, such as a plate 20 secured to the web 8 or other fixed part of the machine in any suitable manner, for example, by means of bolts 21. Preferably the support or plate 20 is provided with slots 22 through which bolts or screws 24 may extend for suitably clamping the belt-confining members in desired relation to the belt drive. For example, the screws 24 may cooperate with clamping plate 25 arranged at the rear of the plate 20. By loosening the clamping screws 24, it will be obvious that the belt-confining members may be adjusted toward and from the belt to provide the desired clearance between the belt and the confining members when the belt is transmitting power. It will, of course, be understood that the belt-confining means herein illustrated are merely shown by way of example, and any other suitable means for confining the sides of the belt may be employed in place of those shown.

Figure 2:
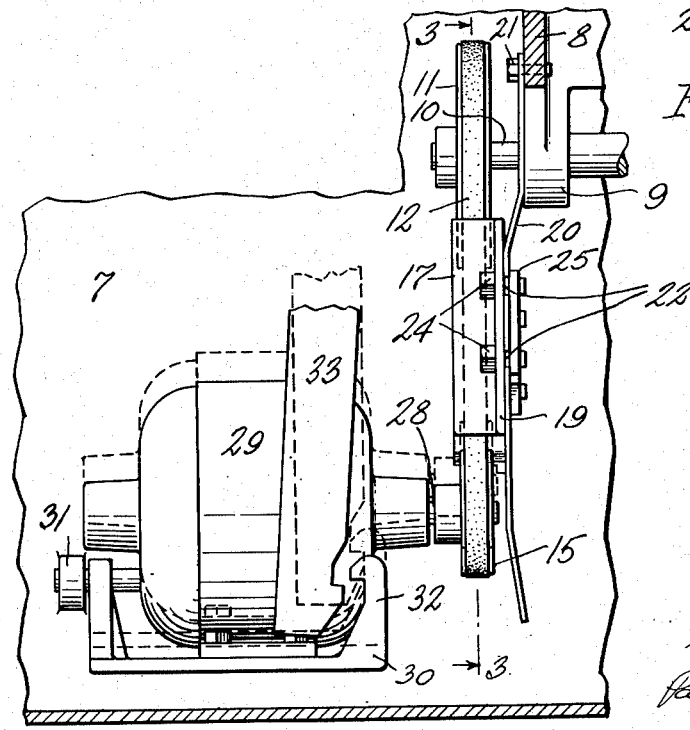
Fig. 2 is an end view thereof showing a part of the machine or apparatus in section, on line 2—2, Fig. 1.

One of the pulleys may be moved toward and from the other pulley in any suitable manner. In the particular construction illustrated, the pulley 15 is secured on the shaft 28 of an electric motor 29, so that power may be transmitted from the motor through the driving pulley 15 and belt 12 to the driven pulley 11. The motor is movably mounted so that the pulley 15 moves with the motor into and out of driving relation to the belt 12, and in the particular construction shown for this purpose, the motor is mounted upon a base 30 pivoted at one end thereof on suitable lugs 31 which may be formed integral with the frame 7 of the machine on which the belt drive is used. The other end of the motor frame is provided with suitable means for swinging the same about its pivotal connection with the lugs 31, the base 30 being for this purpose provided with a hook 32 which may be engaged by the lower end of a rod 33. When the hook and rod are disengaged, as shown in full lines in Fig. 2, the weight of the motor will cause the base 30 to swing about the lugs 31 to cause the pulley 15 to move into driving engagement with the belt 12, as shown in Figs. 1 and 2. If, however, the lower end of the rod moves into engagement with the hook portion 32, and the rod is then raised into the positions indicated by dotted lines in Figs. 2 and 3, the pulley 15 will be moved vertically out of engagement with the belt 12, this being made possible by the confining of the sides of the belt as has been described. Any other means for moving one of the pulleys of the drive mechanism toward and from the other may, of course, be provided in place of that described.

The belt drive mechanism described has the advantage that it may be used not only for the transmission of power, but also for interrupting and again starting the transmission, thus avoiding the use of clutches or other devices heretofore commonly employed for this purpose. By means of the construction shown, the belt-confining means do not subject the belt to wear, due to friction, for the reason that when the belt is being driven, it does not contact with the confining members. By arranging the driving pulley so that it moves out of engagement with the belt, motion of the belt will cease when the driving pulley is out of engagement therewith and, consequently, when the belt contacts with the confining members, its motion is interrupted, so that no frictional wear can result.

I claim as my invention:

1. In a belt drive mechanism, the combination of a driving belt of the relatively thick and narrow type such as one of V-shaped cross section which tends to approximate a circular form when relieved of tension, a driven pulley mounted upon a relatively fixed horizontal axis and over which pulley said belt passes and from which it extends downwardly, a driving pulley mounted beneath said driven pulley for engagement with said belt to apply tension thereto for driving said other pulley, means for suspending said driving pulley so that it may automatically assume driving engagement with said belt by the action of gravity regardless of stretch in said belt from use, belt confining members arranged in fixed relation near to portions of said belt extending between said pulleys and with which said belt is out of contact when under driving tension, and means for moving said driving pulley upwardly towards said driven pulley to relieve said belt of tension, whereupon said belt will engage with said confining members and will be prevented from assuming a circular form and will hang suspended from said driven pulley in such position that its slack will be urged downwardly out of contact with said driving pulley.

2. In a belt drive mechanism, the combination of a driving belt of the relatively thick and narrow type such as one of V-shaped cross section which tends to approximate a circular form when relieved of tension, driving and driven pulleys for said belt arranged with said driven pulley above the driving pulley, a motor having a shaft disposed approximately horizontally and upon which said driving pulley is secured, a pivotal mounting for said motor such that the latter tends to move said driving pulley by gravity into and maintain driving engagement with said belt regardless of stretch in said belt from use, means for swinging said motor upwardly about its pivot against the action of gravity for effecting belt disengaging movement of its driving pulley, and belt confining members arranged adjacent the portions of said belt extending between said pulleys, and which, when said driving pulley is moved upwardly, arrest the movement of said belt as it tends to assume said substantially circular form, thereby restraining the lower portion of said belt from following said driving pulley upwardly and urging and maintaining said lower portion of said belt out of contact with said driving pulley.

THORVALD PETERSEN.